Sept. 6, 1966  D. E. BARKER  3,271,072
HEAD REST FOR MOTOR VEHICLES
Filed June 14, 1965  2 Sheets-Sheet 1
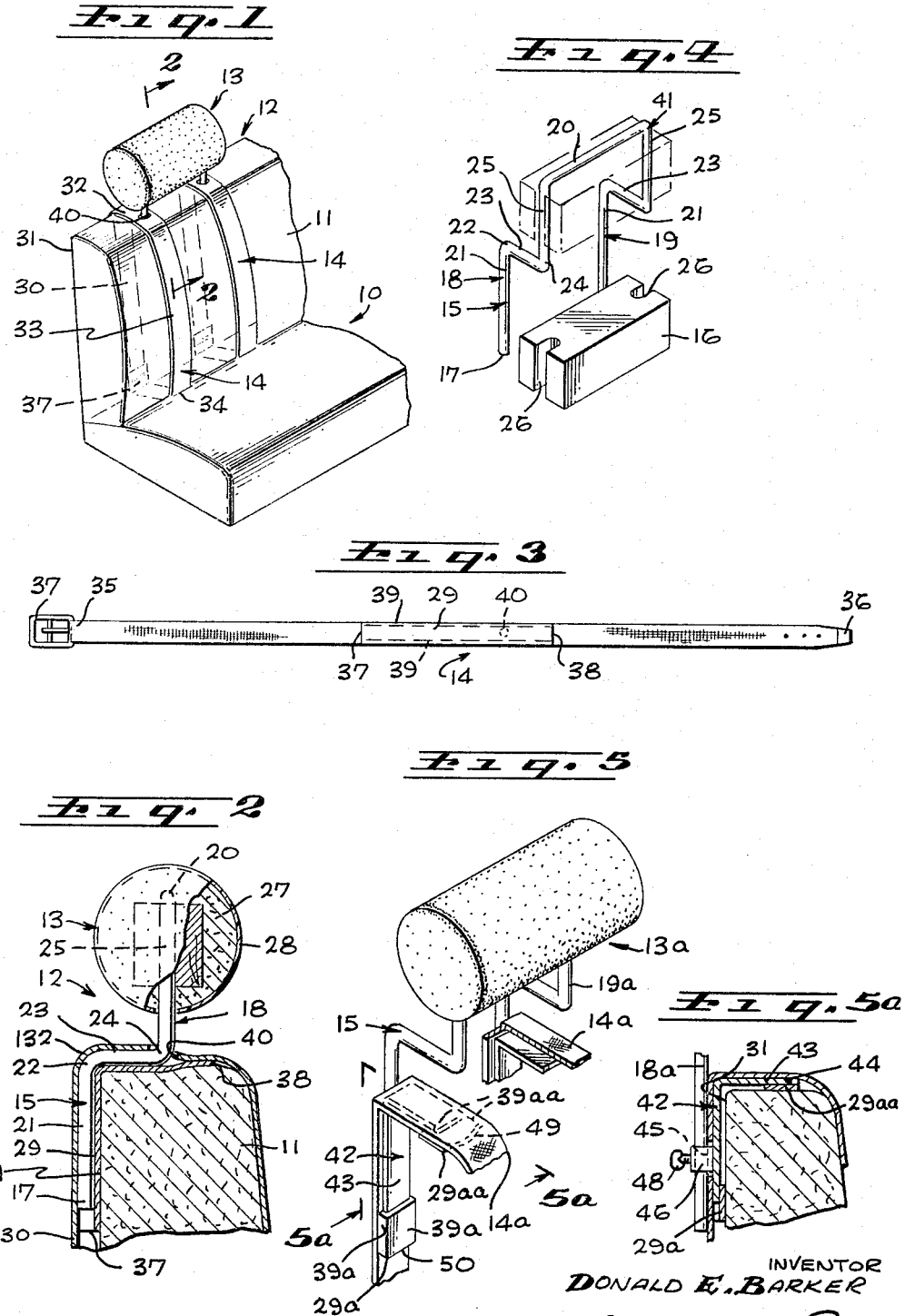

Sept. 6, 1966   D. E. BARKER   3,271,072
HEAD REST FOR MOTOR VEHICLES
Filed June 14, 1965   2 Sheets-Sheet 2
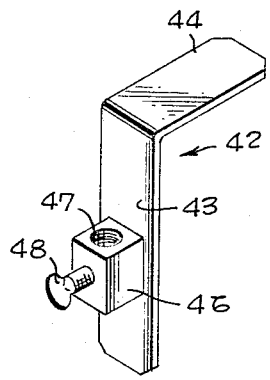
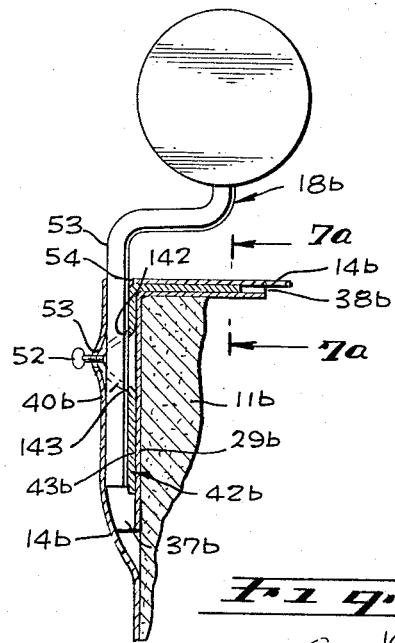
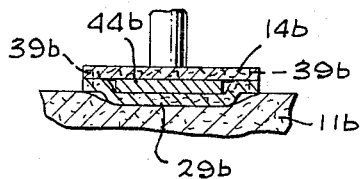
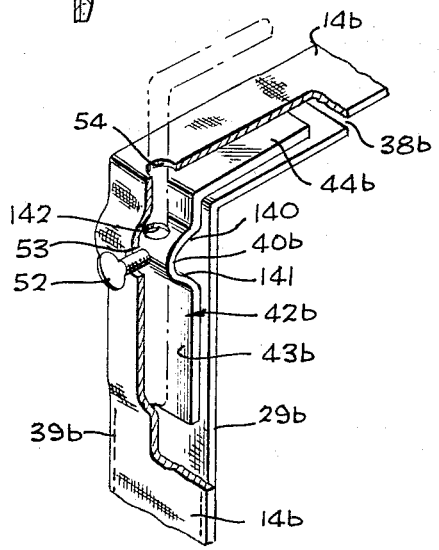
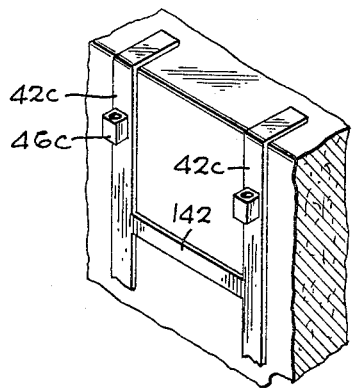
INVENTOR
DONALD E. BARKER
BY William P. Green
ATTORNEY

# United States Patent Office 3,271,072
Patented Sept. 6, 1966

3,271,072
HEAD REST FOR MOTOR VEHICLES
Donald E. Barker, 9352 Balcom Ave.,
Northridge, Calif.
Filed June 14, 1965, Ser. No. 463,755
15 Claims. (Cl. 297—397)

This application is a continuation-in-part of my copending application Serial Number 369,928, filed May 25, 1964, on "Automobile Head Rest or the Like."

The present application relates to improvements in head rest devices for use in automobiles or other motor vehicles.

The above identified application discloses a head rest structure which includes at least one and preferably two flexible straps adapted to be connected to the back of an automobile seat. The straps are utilized for connecting the head rest proper to the seat back, and supporting the head rest in a position above the seat back for engagement with a passenger's head. In accordance with the teachings of my prior application, the head rest proper is connected to the strap or straps very simply and inexpensively by extension of certain mounting portions of the head rest into a pocket or pockets formed on and carried by the straps. This pocket arrangement allows for extremely rapid assembly of the head rest with the straps, without the necessity for any fasteners or complex fastening operation.

The devices constructed in accordance with the present invention are of the above discussed general type, and are in certain respects especially characterized by a capacity for very directly supporting the weight of the head rest, and resisting downward forces exerted by the head rest, without the necessity for requiring the pockets on the straps to take those forces. As will appear, the downward forces exerted by or through the head rest are transmitted directly to the seat back, in a manner positively retaining the head rest in a predetermined position relative to the seat back, and preventing unwanted slipping of the head rest downwardly relative to the seat back.

To attain the above discussed results, I utilize in conjunction with each of the flexible straps a more rigid element, desirably formed of aluminum or other metal, which element has a first portion extending upwardly along the rear surface of the seat back, and merging into a second portion which extends forwardly at the upper side of the seat back. This element, which is desirably of inverted L-shaped configuration, is held in position relative to the seat back by reception within a pocket structure formed on and carried by the associated strap. The strap itself may also have portions extending upwardly at the rear side of the seat back and forwardly across the top of the seat back, with the pocket structure or structures desirably being formed at the inner side of the strap, so that the more rigid frame element is confined between the strap and the seat back.

In one form of the invention, the head rest is connected to the frame element by means extending downwardly through an aperture formed in the upper portion of the strap for connection to the L-shaped element. In another form of the invention, the portion of the rigid frame element at the rear side of the seat back carries means which project rearwardly through an aperture in the strap for typically adjustable connection to a mounting portion of the head rest proper. In still another form of the invention, a mounting portion of the head rest projects downwardly through an aperture in the strap and is adjustable received within two openings formed within a rearwardly deformed projection or bulge formed by the L-shaped member, preferably being held in position by a set screw or other fastener.

Certain additional features of the invention relate to a novel construction for the head rest proper, which may be formed of an elongated member having two upwardly extending arms interconnected at their upper ends by a cross-piece. Between this cross-piece there is receivable an impact block, having grooves which receive the two arms of the elongated element in a manner locating the block relative to the elongated member. Appropriate cushioning material may then be applied to the block, preferably completely about the block to form a well padded head rest element.

The above and other features and objects of the invention, will be better understood from the following detailed description of the typical embodiments illustrated in the accompanying drawings, in which:

FIG. 1 is a perspective view of a head rest assembly embodying the invention;

FIG. 2 is a vertical section on line 2—2 of FIG. 1;

FIG. 3 shows one of the straps separately;

FIG. 4 is an exploded perspective view of the inner construction of the head rest proper of FIG. 1;

FIG. 5 is a perspective view of a variational form of the invention;

FIG. 5a is a section on line 5a—5a of FIG. 5;

FIG. 6 is a detail perspective showing the inner L-shaped element of the FIG. 5 arrangement;

FIG. 7 is a vertical section through one of the two mounting arms of another form of the invention;

FIG. 7a is a section on line 7a—7a of FIG. 7;

FIG. 7b is a perspective view with a portion of the strap removed, and

FIG. 8 is a perspective view showing still another form of the invention.

FIG. 1 illustrates at 10 a conventional automobile seat, having the usual upstanding seat back 11. To the seat back, there is mounted removably a head rest assembly 12, including a head rest proper 13 and two identical connecting straps 14. The preferred construction of head rest 13 is brought out in the exploded perspective view of FIG. 4, which illustrates the head rest as including a main desirably metal and preferably essentially rigid frame element 15 carrying an impact block 16. Element 15 may be formed of metal bar or rod stock, having uniform cross-section along its entire length in extending between the two lower ends or extremities 17 of the element. The bar stock is bent to the configuration illustrated in FIG. 4, to form two parallel essentially identical arms 18 and 19 interconnected at their upper ends by a horizontal cross-piece portion 20 of the elongated element 15. To define arms 18 and 19 more specifically, it is noted that each of the arms in extending upwardly from its lower end 17 has a first preferably directly vertical portion 21 which at 22 is turned forwardly to form a preferably horizontal portion 23 disposed perpendicularly to portion 21 and extending in a directly front to rear direction relative to the vehicle. At 24, each of the arms is turned upwardly, again preferably directly vertically and perpendicular to portion 23, to form spaced parallel vertical portions 25 of element 15 between which block 16 is received. The upper ends of portions 25 are in turn integrally connected together by the cross-piece portion 20 of element 15.

Block 16 may be formed of wood or other essentially rigid and strong material, and may be rectangular, with two parallel oppositely facing vertical grooves 26 formed in opposite sides of block 16 and shaped and positioned to receive and closely confine the two portions 25 of element 15. As will be apparent, block 16 can be inserted upwardly from the full line position of FIG. 4 to the broken line position of FIG. 4, with portions 25 of element 15 being slidably received within grooves 26, so that the interfitting relation between portions 25 and the grooves prevents forward or rearward movement of the block relative to element 15. During initial insertion upwardly of the block into its position of reception within element 15, the portions 23 of arms 18 and 19 may be forced or sprung slightly apart to pass the block, and the material of element 15 may have sufficient resilience to then return the arms relatively toward one another and back into parallelism with one another after the block has passed portions 23 and has reached the broken line position of FIG. 4. The frictional engagement between portions 25 and block 16 may be sufficiently tight to hold the block against downward movement. After the block has been positioned as discussed, the head rest may be appropriately padded and upholstered, by applying about block 16 and engaged portions 20 and 25 of element 15 an appropriate padding material 27, such as foam rubber, enclosed with a suitable covering 28 of cloth, flexible plastic, or the like.

In the form of the invention shown in FIGS. 1 to 4, the arms 18 and 19 of frame element 15, and especially the portions 21 and 23 of those arms, function as the previously mentioned inverted L-shaped elements which are held and located by mounting straps 14. To retain these portions 21 and 23 of the frame element 15, each strap 14 carries at its inner side a strip of material 29 which forms with the strap 14 an inner pocket into which frame element portions 21 and 23 are insertible. The straps themselves may be formed of a suitable woven material or other flexible material adapted to extend about the seat back 11. Each strap may be considered as having a first portion 30 (FIG. 1) which extends essentially vertically upwardly adjacent the rear surface 31 of the seat back, and at the upper end of which the strap turns horizontally forwardly to form a second portion 32, to extend across the top of the seat back, following which the strap extends downwardly at 33 along the front side of the seat back to a location 34 at which the strap extends across the underside of the seat back for connection to the lower end of portion 33. At some point, the strap is of course interrupted to form two ends 35 and 36 which are detachably connectible together by buckle elements 37 or other appropriate detachable and adjustable fastening means, so that the straps may be easily applied to and about the seat, and be tightened in position thereabout.

The pocket forming strips 29 may be of a width corresponding to the width of each strap 14, and of a length to extend between the locations designated 37 and 38 in FIGS. 2 and 3. Strips 29 may be fully flexible, typically being formed of the same type of strap material as are the two straps 14, with each of the pocket forming strips 29 being stitched to the associated strap 14 along a pair of parallel seam lines 39 extending along opposite edges of the strap, and extending longitudinally of the strap. At a location intermediate the ends 37 and 38 of strip 29, the strap 14 contains an aperture 40 which may take the form of a slit which is elongated transversely of strap 14, and preferably located closer to location 38 than location 37. When the straps 14 are in position on the seat, the end 37 of pocket forming strip 29 is located opposite the rear surface 31 of seat back 11, so that the pocket formed between strap 14 and material 29 extends upwardly along the rear surface 31 of the seat back, and then turns forwardly at 132 to extend forwardly across the upper surface 32 of the seat back, with the end 38 of material 29 typically being located at the top of the seat back. Similarly, aperture or slit 40 is in the installed condition located at the top of the seat back, and opens upwardly, and is of a size and configuration to pass upwardly therethrough one of the arms 18 or 19 of head rest frame element 15.

In mounting the device of FIGS. 1 to 4 on a seat back such as that shown at 11, the first step is to insert the lower extremities 17 of arms 18 and 19 of frame element 15 through apertures 40 of the two straps 14, so that the arms 18 and 19 may advance longitudinally of the straps into the pockets formed between and by straps 14 and material 29. Such insertion of the arms into the pockets is continued until portions 21 and 23 of arms 18 and 19 are received in the FIG. 2 position of complete reception within the pockets, with the bends 24 of element 15 and its arms 18 and 19 being located at apertures 40 of the straps, so that portions 25 of arms 18 and 19 may extend upwardly through the apertures to support the cushioned head engaging portion 41 of the assembly in a proper position above the seat back. With the parts thus connected together, the straps 14 are placed about the seat back and are fastened by buckle elements 36 in the FIG. 1 fully installed position. In this condition, the head rest proper 13 is located very positively relative to the seat back by reception of its mounting arms within the pockets formed in and carried by the straps. Further, the extension of portions 23 of the mounting arms across the upper surface of the seat back affords direct and effective support for the head rest proper without transmitting downward forces to the pocket structure. This shoulder type relationship between portions 23 of arms 18 and 19 and the upper end of the seat back also prevents the head rest and straps from gradually slipping downwardly at the rear side of the seat back, and thus permanently locates the head rest in the desired position above the upper edge of the seat back.

FIGS. 5, 5a and 6 illustrate another form of the invention which may be considered as identical with that of FIGS. 1 to 4 except as to the manner of connection of upper head rest proper 13a to straps 14a. In FIGS. 5, 5a and 6, each of the straps 14a carries an additional mounting element 42, formed of aluminum or other essentially rigid material, and having vertical portions 43 extending upwardly along the rear surface 31 of the seat back, and upper portions 44 extending horizontally forwardly along the top of the seat back. The lower end of portion 43 of each element 42 is removably received within a pocket formed by and between strap 14a and a piece of material 29a stitched along its opposite edges 39a to the strap. Similarly, the end of portion 44 is received and confined within a pocket formed between strap 14a and a second piece of material 29aa stitched along its opposite edges 39aa to the strap. Both of the pieces of material 39a and 39aa are desirably located at the inner side of strap 14a. At a location above the level of the piece of material 39a, strap 14a contains an aperture 45 (FIG. 5a) through which there projects rearwardly a socket element 46 which is rigidly welded or otherwise secured to portion 43 of element 42. This socket element contains a vertically extending passage 47 shaped in correspondence with the cross-section of the lower end portions of the two mounting arms 18a and 19a of the upper head rest proper 13a. This head rest proper may typically be of essentially the same construction as structure 13 of the first form of the invention, and more particularly as illustrated in FIG. 4. A set screw 48 is carried by each of the socket elements and is tightenable against an associated one of the mounting arms 18a or 19a, to releasably secure it in any desired adjusted position relative to the straps.

In assembling the arrangement of FIGS. 5, 5a and 6, the first step is to insert elements 42 into their FIG. 5 positions of reception within the pockets carried by straps 14a (and formed by strips 29a and 29aa). This may be done either by inserting one of the ends of element 42 far enough into a first of the pockets to enable insertion of the opposite end into the other pocket, or by slipping element 42 entirely through one of the pockets from its outer open end 49 or 50, and far enough to enable reception of the other end of element 42 within the other pocket. In either case, the material of the strap and pocket forming elements 29a and 29aa is deformed sufficiently to pass socket 45 as required in order to assemble elements 42 on the straps. With elements 42 thus attached to the straps, the two straps are mounted on the seat back in positions corresponding to those shown in FIG. 1, following which the lower ends of mounting arms 18a and 19a of the head rest proper are inserted downwardly into passage 47 of socket elements 46, and are tightened in a desired adjusted position by set screws 48. The arrangement of FIGS. 5, 5a and 6 has of course the advantage of allowing vertical adjustment of the head rest relative to the seat back.

FIGS. 7, 7a and 7b show another form of the invention in which two straps 14b (only one shown) carry pocket forming pieces of material 29b which may be essentially identical with strips 29 of FIGS. 1 to 4, and may be stitched along their opposite edges 39b to the straps, with the two ends 37b and 38b of the pockets being open, as they may also be in the other forms of the invention. Within the pocket thus formed at the inner side of each of these straps 14b, there is removably insertible a rigid inverted L-shaped frame element 42b, having a first portion 43b which extends upwardly at the rear side of the seat back 11b, and a second portion 44b which extends horizontally forwardly at the upper side of the seat back. Element 42b may be formed of a strip of sheet metal, with its portion 43b being deformed rearwardly at a localized area to form a generally U-shaped projection or bulge 40b having upper and lower portions 140 and 141 containing vertically aligned apertures 142 and 143. The two mounting arms of the head rest proper 13b (one of which arms is shown at 18b) may be of circular horizontal cross section. Apertures 142 and 143 may be similarly essentially circularly shaped, so that each arm may extend downwardly through the two apertures 142 and 143 of the corresponding one of the elements 42b, and be confined within those apertures in a manner allowing vertical adjusting movement of the head rest proper relative to elements 42b, but restraining the head rest against other types of movement. The head rest proper may be secured in any desired adjusted position by means of a screw 52 which is threadedly connected into a central aperture in the rearmost portion of bulge or projection 40b, and is tightenable forwardly against arm 18b between apertures 142 and 143. Screw 52 may extend through an appropriate opening 53 formed in strap 14b. Also, arm 18b of the head rest proper may project downwardly through an opening or aperture 54 formed in an upper portion of strap 14b. Above and beneath bulge 40b, the vertical portion of arm 18b may directly engage the rear surface of the vertical portions of element 42b, to further assist in accurately locating the head rest and maintaining it in fixed position relative to each of the two elements 42b.

To assemble the apparatus of FIGS. 7, 7a and 7b, elements 42b are inserted into the pockets formed at the inner sides of two of the straps 14b, by insertion of elements 42b into one of the open ends 37b or 38b of the corresponding pocket. Next, the straps may be connected to the seat back and secured thereon. With the straps thus positioned, arms 18b of the head rest are inserted downwardly through apertures 54 in the straps 14b, and through apertures 142 and 143 of the two projections or bulged portions 40b of elements 42b. When the head rest is at a desired height, set screws 52 are tightened against the arms 18b to releasably lock the head rest in that position.

FIG. 8 represents fragmentarily an arrangement similar to that of FIGS. 5, 5a and 6, but in which the two elements 42c (corresponding to elements 42 of FIGS. 5, 5a and 6) are interconnected by a rigid cross-piece 142 to form together an essentially H-shaped frame structure receivable adjacent the rear surface and top surface of the seat back. The straps are not illustrated in FIG. 8, but may be the same as in FIGS. 5 and 5a, carrying pockets for receiving elements 42b as shown at 29a and 29aa in FIGS. 5 and 5a. Also, the straps may of course contain apertures for passing the socket elements 46c to the outer sides of the straps for adjustably carrying the head rest proper.

I claim:
1. A device for connection to a motor vehicle seat back comprising at least one flexible strap to be connected to the seat back and having a first portion to extend upwardly along the rear side of said back and a second portion to extend forwardly from the upper end of said first portion and along the upper side of the seat back, a more rigid element carried by said strap and having a first portion to extend upwardly along the rear side of said seat back, adjacent said first portion of the strap, and a second portion turned forwardly from the upper end of said first portion of said element at a location to extend along the upper side of the seat back adjacent said strap and in vertical force transmitting relation to the seat back so that downward forces exerted on said element are transmitted to and taken by said upper side of the seat back to prevent relative downward movement of said element, means carried by said strap forming a pocket structure extending longitudinally of the strap into which at least a part of said element is insertible by movement generally longitudinally of the strap to a position of confinement in the pocket, and from which said element is withdrawable by movement generally longitudinally of the strap, and a head rest structure to be received above said seat back and connected to and supported by said element.

2. A device for connection to a motor vehicle seat back comprising at least one flexible strap to be connected to the seat back and having a first portion to extend upwardly along the rear side of said back and a second portion to extend forwardly from the upper end of said first portion and along the upper side of the seat back, a more rigid element carried by said strap and having a first portion to extend upwardly along the rear side of said seat back, adjacent said first portion of the strap, and a second portion turned forwardly from the upper end of said first portion of said element at a location to extend along the upper side of the seat back adjacent said strap and in vertical force transmitting relation to the seat back so that downward forces exerted on said element are transmitted to and taken by said upper side of the seat back to prevent relative downward movement of said element, means carried by said strap forming a pocket structure extending longitudinally of the strap into which at least a part of said element is insertible by movement generally longitudinally of the strap to a position of confinement in the pocket, and from which said element is withdrawable by movement generally longitudinally of the strap, said pocket structure having a first portion carried by said first portion of the strap to extend upwardly at said rear side of the seat back and receive and confine said first portion of said element, and having a second portion carried by said second portion of the strap to extend forwardly at the top of said seat back and receive and confine said second portion of said element, and a head rest structure to be received above said seat back and connected to and supported by said element.

3. A device for connection to a motor vehicle seat back comprising at least one flexible strap to be connected to the seat back and having a first portion to extend upwardly along the rear side of said back and a second portion to extend forwardly from the upper end of said first portion and along the upper side of the seat back, a more rigid element carried by said strap and having a first portion to extend upwardly along the rear side of said seat back, adjacent said first portion of the strap, and a second portion turned forwardly from the upper end of said first portion of said element at a location to extend along the upper side of the seat back adjacent said strap and in vertical force transmitting relation to the seat back so that downward forces exerted on said element are transmitted to and taken by said upper side of the seat back to prevent relative downward movement of said element, means carried by said strap forming a pocket structure extending longitudinally of the strap into which at least a part of said element is insertible by movement generally longitudinally of the strap to a position of confinement in the pocket, and from which said element is withdrawable by movement generally longitudinally of the strap, said pocket structure being carried at an inner side of the strap to be received between the strap and said seat back, said strap containing an aperture, a head rest structure to be received above said seat back, and means extending from said element through said aperture in the strap and connected to and supporting said head rest structure.

4. A device as recited in claim 3, in which said aperture is formed in said first portion of the strap at said rear side of the seat back, said means extending through said aperture including a socket secured to said element, said head rest structure including a member projecting downwardly therefrom and adjustably and detachably received in and securable to said socket.

5. A device for connection to a motor vehicle seat back comprising at least one flexible strap to be connected to the seat back and having a first portion to extend upwardly along the rear side of said back and a second portion to extend forwardly from the upper end of said first portion and along the upper side of the seat back, a more rigid element carried by said strap and having a first portion to extend upwardly along the rear side of said seat back, adjacent said first portion of the strap, and a second portion turned forwardly from the upper end of said first portion of said element to extend along the upper side of the seat back adjacent said strap, means carried by said strap forming a pocket structure extending longitudinally of the strap into which said element is insertible to a position of confinement therein and from which said element is withdrawable, a head rest structure to be received above said seat back, said first portion of said element being formed of a strip of material deformed rearwardly at a localized area to form a rearward projection having upper and lower portions containing vertically aligned apertures; and a mounting part from through said openings in said projection.

6. A device as recited in claim 5, including a fastener threadedly connected to said projection and tightenable against said mounting part to releasably lock said part in any of a plurality of different vertically adjusted positions.

7. A device for connection to a motor vehicle seat back comprising at least one flexible strap to be connected to the seat back and having a first portion to extend upwardly along the rear side of said back and a second portion to extend forwardly from the upper end of said first portion and along the upper side of the seat back, a more rigid element carried by said strap and having a first portion to extend upwardly along the rear side of said seat back, adjacent said first portion of the strap, and a second portion turned forwardly from the upper end of said first portion of said element to extend along the upper side of the seat back adjacent said strap, means carried by said strap forming a pocket structure extending longitudinally of the strap into which said element is insertible to a position of confinement therein and from which said element is withdrawable, said pocket structure having a first portion carried by said first portion of the strap to extend upwardly at said rear side of the seat back and receive and confine said first portion of said element, and having a second portion carried by said second portion of the strap to extend forwardly at the top of said seat back and receive and confine said second portion of said element, a head rest structure to be received above said seat back, said second portion of said strap containing an opening near its juncture with first portion thereof, a mounting part for said head rest structure projecting downwardly therefrom through said opening and extending downwardly along an outer side of said first portion of said element between said strap and said element, said first portion of said element being locally deformed rearwardly to form a projection having upper and lower portions containing vertically aligned apertures through which said mounting part extends, and a set screw threadedly connected to said projection and tightenable against said mounting part to releasably lock said part in any of different set positions.

8. A device for connection to a motor vehicle seat back comprising two spaced flexible straps adapted to extend essentially vertically about said seat back to have portions extending upwardly at the rear side of said seat back, then forwardly at the top of the back and then downwardly at the front of said seat back, fastener means for securing opposite ends of said straps together to retain them on the seat back, two similar essentially rigid elements carried by said straps respectively at the inner sides thereof to be received between the straps and said seat back, said elements having first portions extending upwardly at the rear of said back and second portions extending forwardly at the top of said back in vertical force transmitting relation to the back so that downward forces exerted on said elements are transmitted to and taken by said seat back to prevent relative downward movement of said elements, flexible material secured to said inner sides of the straps and forming pocket structures into and out of which said elements are movable by displacement generally longitudinally of the straps, said pocket structures having first portions to be received at the rear side of said seat back to receive and confine said first portions of said elements, said pocket structures having second portions to be received at the top of said back beneath said strap to receive and confine said second portions of said elements, and a head rest structure secured to and supported by said elements.

9. A device as recited in claim 8, in which said pockets include two spaced pockets on each of said straps for receiving said two portions respectively of said elements, each strap containing an aperture between said two pockets thereon, said device including two connections carried by said elements and projecting through said apertures and adjustably connectible to said head rest structure.

10. A head rest comprising an elongated frame member of essentially U-shape having two generally parallel upwardly extending arms interconnected at their upper ends by a generally horizontal cross-piece portion of said member integral with said arms, a block slidably insertible upwardly into position between said arms and having grooves at its opposite sides slidably receiving said arms to locate the block therebetween, and cushioning means received at at least the forward side of the block.

11. A head rest as recited in claim 10, in which said arms have first portions extending upwardly which merge into second forwardly extending portions, and which second portions in turn merge into third upwardly extending portions between which said block is received.

12. A head rest to be connected to a motor vehicle seat back, comprising an elongated frame member of essentially U-shape having two generally parallel upwardly extending arms interconnected at their upper ends by a generally horizontal cross-piece portion of said member integral with the arms, a block slidably insertible upwardly into position between said arms and having grooves at its opposite sides slidably receiving said arms to locate the block therebetween, cushioning means received at at least the forward side of the block, and two flexible straps connectible to said seat back and having pockets into which said arms are insertible to support said frame member and from which said arms are withdrawable.

13. A head rest as recited in claim 12, in which said straps have first portions for extending upwardly behind said seat back and second portions for extending forwardly at the top of said seat back, and said arms have first portions extending upwardly behind said seat back and which merge into second portions extending forwardly at the top of said seat back, said second portions of said arm merging at their foward ends into third portions thereof extending upwardly to said cross piece, said block being received between said third portions of said arms.

14. A device for connection to a motor vehicle seat back comprising two spaced flexible straps adapted to extend essentially vertically about said seat back to have portions extending upwardly at the rear side of said seat back, then forwardly at the top of the back to form upper portions of the strap, and then downwardly at the front of said seat back, said upper portions of the strap containing upwardly opening apertures, fastener means for securing opposite ends of said straps together to retain them on the seat back, two similar essentially rigid elements carried by said straps respectively at the inner sides thereof to be received between the straps and said seat back, said elements having first portions extending upwardly at the rear of said back and second portions extending forwardly at the top of said back and beneath the strap in vertical force transmitting relation to the back so that downward forces exerted on said elements are transmitted to and taken by said seat back to prevent relative downward movement of said elements, flexible material secured to said inner sides of the straps and forming pocket structures into and out of which said elements are movable by displacement generally longitudinally of the straps, said pocket structures having first portions to be received at the rear side of said seat back to receive and confine said first portions of said elements, said pocket structures having second portions to be received at the top of said back beneath said strap to receive and confine said second portions of said elements, said elements having third portions extending upwardly from the forward ends of said second portions and through said apertures, and a head rest structure secured to and supported by said third portions of said elements.

15. A head rest comprising an elongated frame member of essentially U-shape having two generally parallel upwardly extending arms interconnected at their upper ends by a generally horizontal cross-piece portion of said member, and a head supporting block to be mounted and located by said frame member and to bridge across said arms thereof and containing two spaced generally vertically extending passages adapted to slidably receive said two arms of the frame member in a relation enabling said block to be slidably inserted upwardly relative to said arms to a position of retention thereby.

References Cited by the Examiner

UNITED STATES PATENTS

| | | | |
|---|---|---|---|
| D. 201,961 | 8/1965 | Lohn | 297—397 |
| 18,998 | 12/1857 | Waters | 297—397 |
| 1,565,514 | 12/1925 | Schumacher | 297—399 |
| 2,573,186 | 10/1951 | De Meir | 297—399 |
| 2,661,050 | 12/1953 | Felter | 297—391 |
| 3,205,005 | 9/1965 | Brown | 297—410 |

FRANK B. SHERRY, *Primary Examiner.*

CASMIR A. NUNBERG, *Examiner.*